United States Patent
Hesl et al.

(10) Patent No.: US 8,025,440 B2
(45) Date of Patent: Sep. 27, 2011

(54) CARRIAGE WITH PIVOTED BRACE FOR A CABLE CONNECTION

(75) Inventors: Stefan Hesl, Eschenbach (DE); Thomas Will, Kemnath (DE)

(73) Assignee: Siemens Aktiengesellschaft, Munich (DE)

( * ) Notice: Subject to any disclaimer, the term of this patent is extended or adjusted under 35 U.S.C. 154(b) by 388 days.

(21) Appl. No.: 12/290,562

(22) Filed: Oct. 30, 2008

(65) Prior Publication Data

US 2009/0121090 A1    May 14, 2009

(30) Foreign Application Priority Data

Nov. 5, 2007   (DE) .................... 10 2007 052 646

(51) Int. Cl.
*H05G 1/02* (2006.01)
*F16L 3/02* (2006.01)
(52) U.S. Cl. .......................... 378/194; 248/51
(58) Field of Classification Search ............... 378/101, 378/193–197; 248/51
See application file for complete search history.

(56) References Cited

U.S. PATENT DOCUMENTS

| | | | |
|---|---|---|---|
| 4,001,593 A * | 1/1977 | Wing et al. .................. | 378/11 |
| 4,129,277 A | 12/1978 | Tenniswood | |
| 4,462,565 A | 7/1984 | Johnson | |
| 2006/0262906 A1 | 11/2006 | Molz et al. | |
| 2008/0247516 A1 * | 10/2008 | Fink et al. .................... | 378/194 |

FOREIGN PATENT DOCUMENTS

| | | |
|---|---|---|
| DE | 1 914 899 | 4/1965 |
| DE | 42 07 219 A1 | 9/1992 |
| DE | 198 38 594 C1 | 4/2000 |
| DE | 103 20 841 A1 | 12/2004 |
| DE | 10 2005 022 343 | 11/2006 |
| DE | 10 2005 027 672 | 12/2006 |
| EP | 0 819 226 B1 | 1/1998 |
| FR | 2847394 A1 | 5/2004 |
| JP | 10220533 | 8/1998 |

OTHER PUBLICATIONS

German Office Action dated Nov. 5, 2008 with English translation.
Chinese Office Action dated Feb. 24, 2011 for Chinese Patent Application No. 200810174760.9 with English translation.

* cited by examiner

*Primary Examiner* — Irakli Kiknadze
(74) *Attorney, Agent, or Firm* — Lempia Summerfield Katz LLC

(57) ABSTRACT

A carriage that can be attached to and move on a rail is provided. The carriage has a contact area that supports a cable connection, for example, for a power supply. An end section of the contact area is designed so as to fold down on removal of a pressure exerted by a section of the cable connection lying thereon, so that as a result the carriage is contracted.

11 Claims, 2 Drawing Sheets ns applied. An energy chain 10 may be used as the cable connection.

CARRIAGE WITH PIVOTED BRACE FOR A CABLE CONNECTION

This application claims the benefit of DE 10 2007 052 646.8 filed Nov. 5, 2007, which is hereby incorporated by reference.

BACKGROUND

The present embodiments relate to a carriage that is movably attached to a rail.

Attaching technical equipment to the ceiling of a room enables the available space to be used economically in many situations. For more flexible use of devices suspended from the ceiling use is frequently made of longitudinal ceiling rails with transverse carriages, which permit transverse displacement or transverse travel of the technical device attached to the carriage. Technical devices suspended from the ceiling are found not only in factories but also in hospitals, where medical diagnostic devices are attached in this way. DE 19838594 C1 describes an x-ray ceiling stand with a transverse carriage suspended from a longitudinal ceiling rail.

Movable technical devices suspended from the ceiling may be supplied with power using cables. EP 0819226 B1 describes energy chains used to guide the cable.

Supplying power to a technical device suspended from the ceiling using a cable connection, for example, a cable guided in an energy chain, has the drawback that the cable connection hangs down between the attachment points. Cable connections that hang down restrict the space and increase the risk that people will knock against cables that are hanging down. The use of energy chains improves the situation because the cables are guided in a controlled manner. However, the self-supporting area of the energy chain can sag considerably. To reduce this, the transverse carriage is generally fitted with a brace or a support bracket, which carries part of the energy chain. The longer this support bracket is, the more the sag in the energy chain is reduced. However, a drawback of this is that extending the brace restricts or reduces the area available for the carriage to travel. The space requirement for the ceiling stand is thus increased.

DE 102005022343 A1 and DE 102005027672 A1 describe a power rail above a longitudinal rail for a transverse carriage. The transverse carriage is supplied via the power line by a sliding contact. This solution is not easy to implement technically for high voltages and entails the difficulty of how the power rail can or should be suitably protected.

SUMMARY

The present embodiments may obviate one or more of the problems or drawbacks inherent in the related art. For example, in one embodiment, the cable-based supply of energy for carriages that run along ceiling rails is improved.

In one embodiment, a carriage, which can be attached to and move on a rail, includes a contact area that supports a cable-type connection. The cable-type connection may be a power supply. An end section of the contact area is designed so as to fold down on removal of a pressure exerted by a section of the cable-type connection lying thereon, so that as a result the carriage is contracted (e.g. the parts are drawn together or shortened).

The travel range of a carriage suspended from a ceiling rail can be increased by providing a brace for the cable or energy chain. The cable or energy chain contracts when the carriage meets a limit of the travel range or reaches the end of the travel range.

A long brace may be used in the greater part of the travel range of the carriage without bringing about any restriction or reduction in the travel range, since because the brace contracts at the end of the rail the travel range is not reduced or restricted.

The carriage may be attached to or suspended from a ceiling rail. The carriage may have a contact area or support bracket to support a cable-type connection, such as a power supply. The contact area includes an end section designed to fold down or pivot out of the way. The end section folds down if the weight of the section of the cable-type connection resting on the end section is removed. Accordingly, the carriage or the contact area is contracted and a restriction of the travel range is avoided.

The cable connection may be a cable guided in an energy chain, but may be an unguided cable or hose. In one embodiment, the cable connection may be a power supply. However, in other embodiments, the cable connection may serve other purposes, for example, the supply of water in hydraulic applications or the transmission of control commands.

A force effecting the contraction or tilting can be generated by a spring. This force is then applied when the pressure exerted by the cable connection is removed.

In one embodiment, an apparatus (e.g. x-ray ceiling stand system) includes a carriage and a cable connection supported by the carriage. The cable connection is designed (e.g. length) and attached (e.g. determining the points at which the cable-type connection is fixed), such that the section of the cable connection lying on the end section rolls away on reaching a limit or an end of a rail, so that the removal of the pressure causes the end section to fold down.

DETAILED DESCRIPTION

Figure 1:
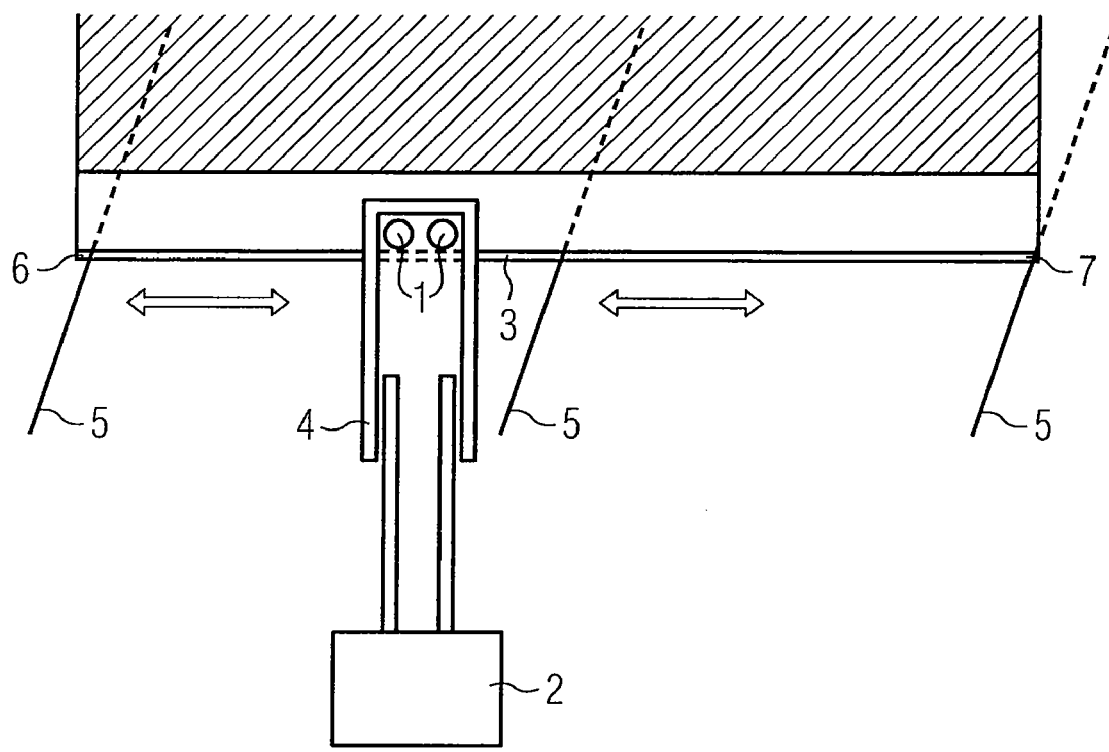
FIG. 1 illustrates one embodiment of an x-ray ceiling stand.

FIG. 1 shows an x-ray ceiling stand. An x-ray source 2 is attached to a longitudinal ceiling rail 3 by a carriage 1 running on rails, such as transverse rails and longitudinal rails. Transverse rails may enable the x-ray source 2 to move perpendicular to the drawing plane. Three transverse rails 5 are indicated in FIG. 1. The x-ray source 2 is attached to a vertical telescopic arm 4, by which the vertical position of the x-ray source 2 can be adjusted. The horizontal position can be changed by moving the carriage 1. The x-ray source may irradiate downward. The x-rays penetrate a patient placed on a table underneath the x-ray source 2 and are recorded by an x-ray detector (known as an undertable device) arranged under the table.

Figure 2:
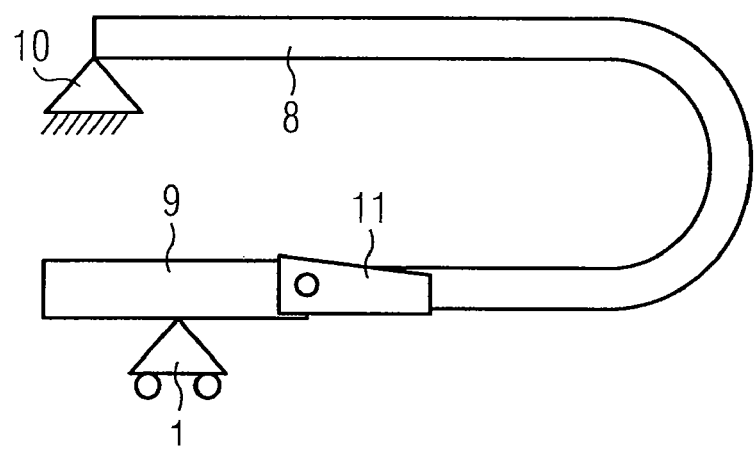
FIG. 2 illustrates one embodiment of a carriage.
Figure 3:
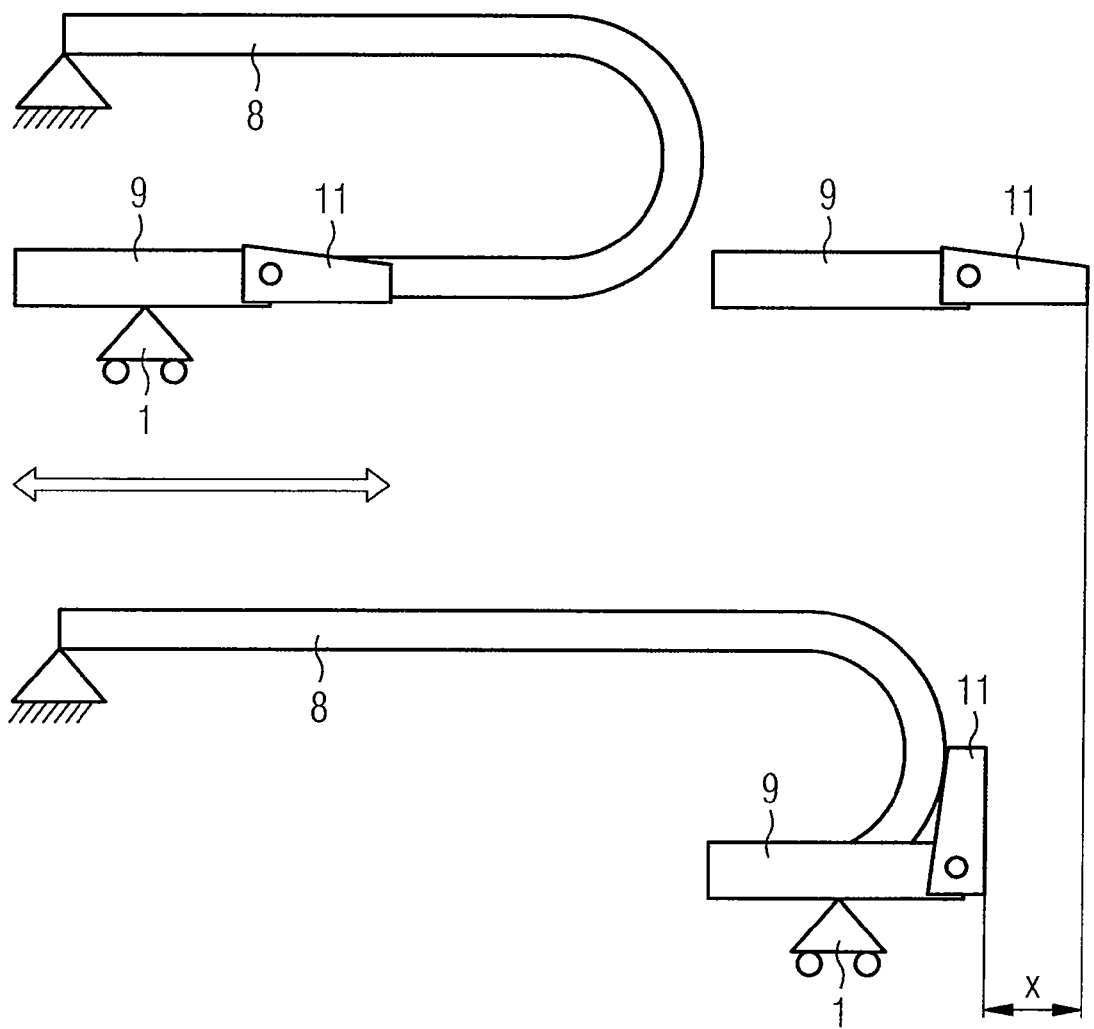
FIG. 3 illustrates one embodiment a carriage with a contact area.

The horizontal travel range is restricted by the end points 6 and 7 of the ceiling rail 3. FIG. 2 illustrates a contact area 9 for an energy chain 8. The (diagrammatically illustrated) carriage 1 includes an oblong contact area 9 or a support bracket, which carries part of the energy chain 8. To stop the energy chain 8 slipping sideways, the contact area 9 may have a depression in the center in cross-section (e.g. bowl-shaped or U-shaped cross-section). The end of the energy chain 10 is fixed. An energy supply cable enters the energy chain 8 at the end of the energy chain 10 and is guided to the carriage 1. FIG. 3 illustrates a contact area that includes an end 11. The end 11 is a spring, pivoted bracket which folds down when pressure is removed. This is shown in FIG. 3. The lower part of FIG. 3 shows the contact area 9 with folded-down end 11. The end 11 may be referred to as end 11 or bracket 11. The bracket 11 may be held in the horizontal position by the weight of the energy chain 10. The folding down is then brought about by the pressure of a spring when the carriage 1 reaches the end of the travel range (e.g. 6 and 7 in FIG. 1). Accordingly, the energy chain is dimensioned or selected with a length so that at the end of the travel range, as a result of the cable section, which was supported by the bracket 11 rolling away, the weight of the cable section no longer presses on the bracket 11, which folds down. FIG. 3 further shows that as a result of the bracket 11 folding down the travel range is extended by the distance x.

The invention is not restricted to the application shown here. The invention can also be used in areas other than medical engineering. For example, the invention may be used in automation engineering. Nor is the application restricted to ceiling rails. For example, the invention can also be used for floor rails.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A carriage operable to be attached to and move on a rail, the carriage comprising:
    a contact area that supports a cable connection for a power supply, the contact area having an end section that is operable to fold down on removal of a pressure exerted by the cable connection lying on the contact area, so that the carriage is contracted.

2. The carriage as claimed in claim 1, wherein the contact area includes a spring that is operable to provide a force that folds down the end section on removal of the pressure exerted by the cable connection.

3. The carriage as claimed in claim 1, wherein the carriage is operable to contract on reaching a limit of the rail.

4. The carriage as claimed in claim 1, wherein the cable connection includes an energy chain.

5. The carriage as claimed in claim 1, wherein an x-ray source is attached to the carriage.

6. An apparatus comprising:
    a cable connection; and
    a carriage having a contact area that supports the cable connection, the contact area having an end section that is operable to fold down on removal of a pressure exerted by the cable connection lying on the contact area,
    wherein a section of the cable connection lying on the end section is operable to roll away on reaching a limit of a rail, so that removing the pressure causes the end section to fold down.

7. The apparatus as claimed in claim 6, wherein the cable connection is for a power supply.

8. The apparatus as claimed in claim 6, wherein the cable connection is for a water supply.

9. The apparatus as claimed in claim 6, wherein the cable connection is a cable guided in an energy chain.

10. The apparatus as claimed in claim 9, wherein the energy chain is a guide that is operable to guide a cable.

11. The apparatus as claimed in claim 6, wherein the cable connection is an unguided cable or hose.

* * * * *